(12) United States Patent
Kim et al.

(10) Patent No.: US 10,727,942 B2
(45) Date of Patent: Jul. 28, 2020

(54) OPTICAL WIRELESS POWER TRANSFER SYSTEM PERFORMING BIDIRECTIONAL COMMUNICATION

(71) Applicant: LG ELECTRONICS INC., Seoul (KR)

(72) Inventors: Kyunghwan Kim, Seoul (KR); Gyunghwan Yuk, Seoul (KR); Byungsang Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/555,605

(22) Filed: Aug. 29, 2019

(65) Prior Publication Data
US 2020/0076506 A1    Mar. 5, 2020

(30) Foreign Application Priority Data

Aug. 30, 2018  (KR) .................. 10-2018-0103040

(51) Int. Cl.
*H04B 10/114*   (2013.01)
*H04B 10/80*    (2013.01)
*H02J 50/80*    (2016.01)
*H04B 10/69*    (2013.01)
(Continued)

(52) U.S. Cl.
CPC .......... *H04B 10/1143* (2013.01); *H02J 50/30* (2016.02); *H02J 50/80* (2016.02); *H04B 10/54* (2013.01); *H04B 10/69* (2013.01); *H04B 10/808* (2013.01)

(58) Field of Classification Search
CPC .... H04B 10/1143; H04B 10/54; H04B 10/69; H04B 10/808; H02J 50/80; H02J 50/30
See application file for complete search history.

(56) References Cited

U.S. PATENT DOCUMENTS

2018/0136364 A1*   5/2018  Kare ........................ H01S 5/005
2018/0267282 A1*   9/2018  Kaufman ............... G02B 17/08
(Continued)

FOREIGN PATENT DOCUMENTS

DE         102017220588 A1    5/2019
EP             3076201 A1    10/2016
WO       WO 2018/135774 A1    7/2018

*Primary Examiner* — Mina M Shalaby
(74) *Attorney, Agent, or Firm* — Birch, Stewart, Kolasch & Birch, LLP

(57) ABSTRACT

An optical wireless power transfer system including a transmission module having a power light source configured to output power light; a communication light source configured to output communication light; a mirror disposed in a light path of the power light source and the communication light source and configured to pass the power light and reflect the communication light; and a transmitting processor configured to modulate the communication light to have a first modulation. The wireless power transfer system also includes a reception module having a photoelectric cell configured to receive the power light from the transmission module and generate power; a retro-reflector configured to retro-reflect the communication light back to the transmission module; and a receiving processor configured to control the retro-reflector to reflect the communication light to have a second modulation based on the power generated by the photoelectric cell.

11 Claims, 6 Drawing Sheets

(51) Int. Cl.
*H02J 50/30* (2016.01)
*H04B 10/54* (2013.01)

(56) References Cited

U.S. PATENT DOCUMENTS

2018/0284280 A1* 10/2018 Eichenholz ........ G02B 27/0977
2019/0334389 A1   10/2019 Kim et al.

* cited by examiner

OPTICAL WIRELESS POWER TRANSFER SYSTEM PERFORMING BIDIRECTIONAL COMMUNICATION

CROSS-REFERENCE TO RELATED APPLICATION

Pursuant to 35 U.S.C. § 119(a), this application claims the benefit of an earlier filing date and priority to Korean Application No. 10-2018-0103040 filed in the Republic of Korea on Aug. 30, 2018, the contents of which are incorporated by reference herein in its entirety.

BACKGROUND OF THE INVENTION

1. Field of the Invention

An optical wireless power transfer system performing wireless bidirectional communication using light is disclosed herein.

2. Discussion of the Related Art

Recently, in a home appliance market, a main body that performs a main function and a wireless terminal capable of performing an additional function in conjunction with the main body may be provided together. For example, in the cooktop market, which has recently greatly increased in size, the cooktop may include a main body that performs a function for heating food, and a detachable knob switch that may be removably attached to the main body and may perform additional functions for adjusting an intensity of heating.

However, the wireless terminal provided as described above may require an additional battery to perform wireless communication with the main body, and a volume and a weight of the wireless terminal may be increased because the battery is mounted on the wireless terminal. Further, as the battery is discharged over time, users may not only periodically replace the battery of the wireless terminal, but also a required function may not be performed through the wireless terminal when the battery is discharged in unexpected situations.

SUMMARY OF THE INVENTION

The present disclosure provides an optical wireless power transfer system that performs wireless bidirectional communication using light.

The present disclosure further provides an optical wireless power transfer system using light as a power source.

The present disclosure also provides an optical wireless power transfer system that transmits and receives a modulated signal through light.

The objects of the present disclosure are not limited to the above-mentioned objects, and other objects and advantages of the present disclosure which are not mentioned may be understood by the following description and more clearly understood by the embodiments of the present disclosure. It will also be readily apparent that the objects and the advantages of the present disclosure may be implemented by features defined in claims and a combination thereof.

According to the present disclosure, the optical wireless power transfer system may include a transmission module that outputs communication light or main light and receives a reflected light and processes a modulated signal included in the reflected light, and the reception module that processes the modulated signal included in the communication light or the main light and reflects the communication light or the main light and outputs the reflected light, to perform the wireless bidirectional communication using the light.

Further, according to the present disclosure, the optical wireless power transfer system may include the transmission module that outputs the power light or the main light and the reception module that receives the power light or the main light to generate the power and enables the modulated signal to be included in the reflected light based on the generated power, to use the light as the power source.

Further, according to the present disclosure, the optical wireless power transfer system may include the transmission module that adjusts the intensity of the communication light or the main light and output the communication light or the main light and the reception module that identifies the modulated signal based on the intensity of the communication light or the main light, to transmit and receive the modulated signal through the light.

According to the present disclosure, the wireless bidirectional communication is performed using the light, thereby increasing a possible distance to perform communication between terminals.

Further, according to the present disclosure, an additional battery may not be mounted on the wireless terminal using the light as the power source, thereby reducing the volume and the weight of the terminal.

Further, according to the present disclosure, the modulated signal may be transmitted and received through the light, thereby preventing electromagnetic interference (EMI) that occurs based on periphery electronic devices.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Figure 1:
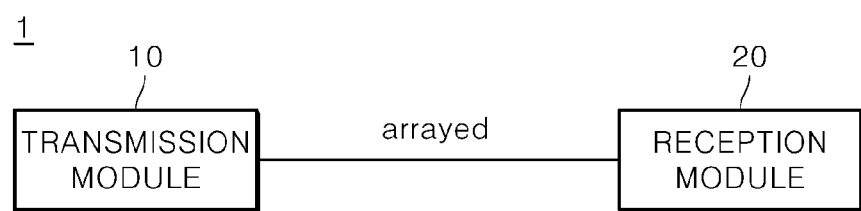
FIG. 1 is a block diagram illustrating an optical wireless power transfer system of the present disclosure.

The above-mentioned objects, features, and advantages of the present disclosure will be described in detail with reference to the accompanying drawings. Accordingly, the skilled person in the art to which the present disclosure pertains may easily implement the technical idea of the present disclosure. Preferred embodiments of the present disclosure are described in detail with reference to the accompanying drawings. In the drawings, same reference numerals are used to refer to same or similar components.

The present disclosure relates to an optical wireless power transfer system capable of performing bidirectional communication wirelessly using light. Hereinafter, the optical wireless power transfer system of the present disclosure will be described in detail with reference to FIGS. 1 to 6.

Referring to FIG. 1, according to the present disclosure, an optical wireless power transfer system 1 may include a transmission module 10 and a reception module 20. The optical wireless power transfer system 1 shown in FIG. 1 is exemplary, and components of the optical wireless power transfer system 1 are not limited to the embodiment shown in FIG. 1, and some components of the optical wireless power transfer system 1 may be added, changed, or deleted as necessary.

As shown in FIG. 1, the transmission module 10 and the reception module 20 included in the optical wireless power transfer system 1 may be arrayed. In other words, each module may be arrayed at a preset position with respect to another module and may operate.

A method in which each module is arrayed and a method of determining, by the transmission module 10, a state in which modules are arrayed are described below. Further, the transmission module 10 can output power light and communication light including a first modulated signal, receive reflected light which is generated by reflecting the communication light, and process a second modulated signal included in the reflected light.

In addition, the transmission module 10 may include a processor that processes a signal and two kinds of light sources that the output power light and the communication light, respectively. Further, the reception module 20 can process the first modulated signal included in the communication light output by the transmission module 10, reflect the communication light, and output the reflected light. Also, the reception module 20 can enable the second modulated signal to be included in the reflected light based on power generated by the power light output by the transmission module 10. Further, the reception module 20 may also include a processor that processes a signal, a reflector that reflects communication light, and an optical generator that generates power using the power light.

Figure 2:
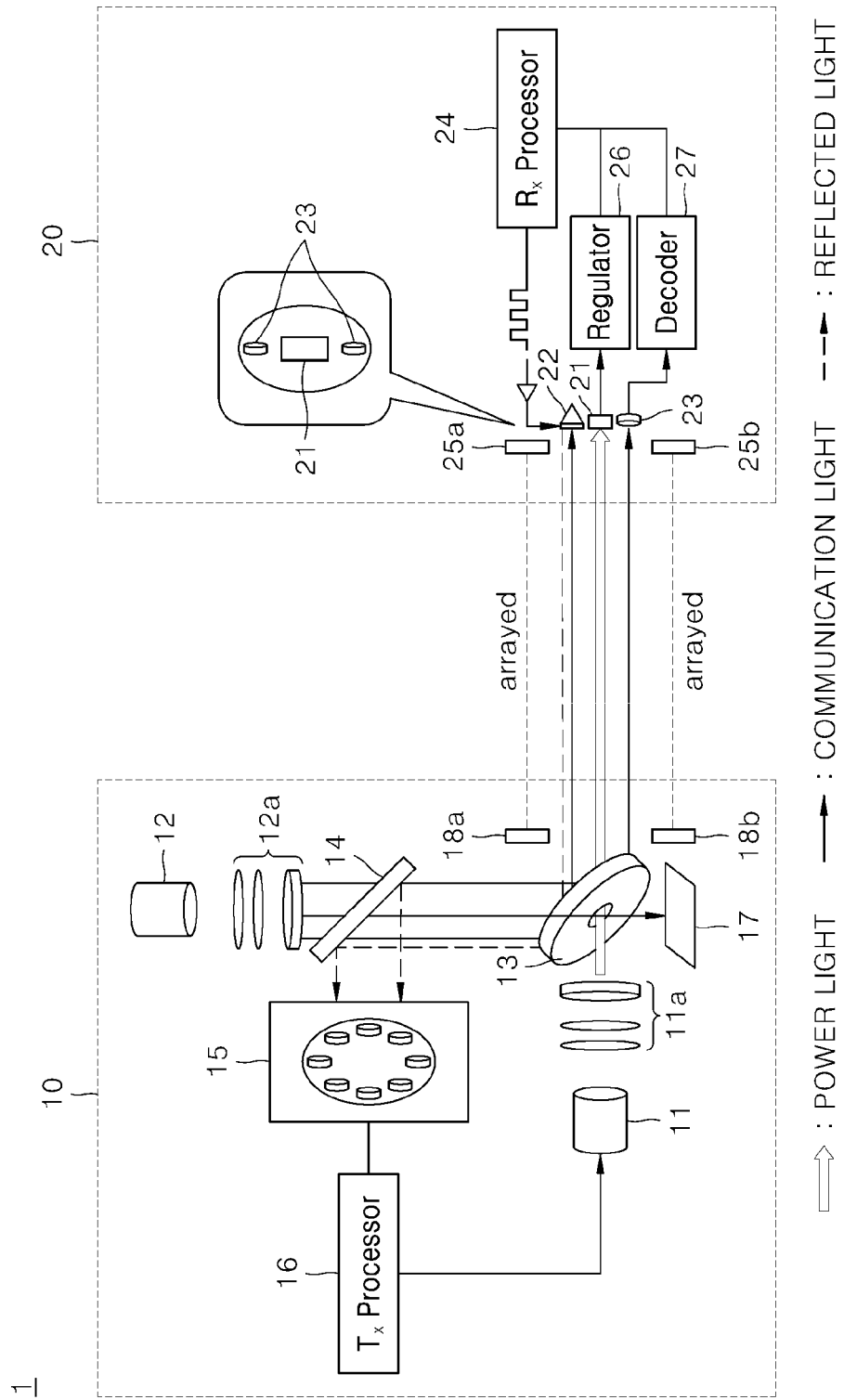
FIG. 2 is an overview illustrating each component of an optical wireless power transfer system according to an embodiment of the present disclosure.

The optical wireless power transfer system 1 according to an embodiment of the present disclosure is described below in more detail with reference to FIGS. 2 and 3. Referring to FIG. 2, according to an embodiment of the present disclosure, the transmission module 10 may include a power light source 11, a communication light source 12, a mirror 13, a beam splitter 14, and a first light diode 15, a transmitting processor 16, an optical absorber 17, and first magnetic bodies 18a and 18b.

In addition, according to an embodiment of the present disclosure, the reception module 20 may include a photoelectric cell 21, a retro-reflector 22, a second photodiode 23, a receiving processor 24, and second magnetic bodies 25a, 25b, a regulator 26, and a decoder 27. The transmission module 10 and the reception module 20 shown in FIG. 2 are exemplary, and components of the transmission module 10 and the reception module 20 are not limited to the embodiment shown in FIG. 2, and some components may be added, changed or deleted as necessary.

Hereinafter, a path of light output by the optical wireless power transfer system 1 according to an embodiment of the present disclosure is described below in detail with reference to FIG. 2. In more detail, the power light source 11 and the communication light source 12 of the transmission module 10 output power light and communication light, respectively.

In the present disclosure, the power light and the communication light can perform functions. More specifically, the power light can be output by the transmission module 10 to provide the reception module 20 with the power, and communication light can be output by the transmission module 10 to provide the reception module 20 with a specific signal.

In addition, at least one of lens 11a, 12a may be further provided at an output end of the power light source 11 and an output end of the communication light source 12 to increase a light-transmission efficiency of each of the power light and the communication light, and the lenses 11a and 12a may be operated as a beam expander, a collimator, and the like. Further, the mirror 13 of the transmission module 10 passes the power light and reflects the communication light.

More specifically, the mirror 13 can pass the power light output by the power light source 11 without change and can reflect the communication light output by the communication light source 12 toward the reception module 20. As shown in FIG. 2, the mirror 13 is a reflector in which a hole is provided to pass the power light, and has a predetermined angle between the communication light source 12 and the reception module 20.

In addition, a portion of the communication light output by the communication light source 12 may pass through the hole provided in the mirror 13. Thus, the optical absorber 17 of the transmission module 10 can be placed on an extension line connecting the communication light source 12 and the hole to absorb the communication light that has passed through the hole provided in the mirror 13.

Further, the transmitting processor Tx 16 of the transmission module 10 controls the communication light source 12 to enable the first modulated signal to be included in the communication light. In the present disclosure, the modulated signal (the first modulated signal and the second modulated signal) may refer to all kinds of signals transmitted and received between the transmission module 10 and the reception module 20. In addition, the transmitting processor 16 can control the first modulated signal to be included in the communication light through an on-off keying method, an intensity modulation (IM) method, and the like, and the method of generating the modulated signal is described below.

Further, the photoelectric cell 21 of the reception module 20 receives the power light to generate the power. The photoelectric cell 21 may be any element through which a current flows when light is received and may include a solar cell. The photoelectric cell 21 can also receive the power light output by the power light source 11 to generate the power based on the intensity of the light. As the power light output by the power light source 11 goes straight through the hole of the mirror 13 described above, the power light source 11 and the photoelectric cell 21 can be placed in a straight line.

As shown in FIG. 2, the photoelectric cell 21 can be connected to the regulator 26, and the regulator 26 can convert the power generated by the photoelectric cell 21 into a predetermined voltage and provides the receiving processor (Rx Processor) 24 with the predetermined voltage.

Accordingly, the receiving processor 24 can be powered by the power generated by the photoelectric cell 21.

Further, the second photodiode 23 of the reception module 20 can convert the communication light into an electric signal. Then, the receiving processor 24 can identify the first modulated signal based on the electrical signal converted by the second photodiode 23 and process the identified first modulated signal.

In the present disclosure, the photodiodes (a first photodiode 15 and a second photodiode 23) may be any semiconductor diodes that convert light energy into electrical signals. Such a photodiode may be a single element, or may have an array form in which a plurality of elements are regularly arranged.

In addition, the second photodiode 23 can convert the communication light output by the communication light source 12 into the electric signal based on the intensity of the light. The decoder 27 connected to the second photodiode 23 can then convert the electrical signal output by the photodiode into a digital signal and provide the receiving processor 24 with the converted digital signal.

Further, the receiving processor 24 can identify the transmitted first modulated signal included in the communication light based on the digital signal provided by the second photodiode 23 and the decoder 27. The receiving processor 24 can then process the identified first modulated signal. More specifically, the receiving processor 24 can generate a control signal based on the first modulated signal or generate a response signal corresponding to the first modulated signal. Further, the receiving processor 24 can perform various kinds of operations to process a signal.

In addition, the retro-reflector 22 of the reception module 20 can retro-reflect the communication light to output the reflected light. More specifically, the retro-reflector 22 can output the reflected light by reflecting the incident communication light in a direction opposite to an incident direction. As shown in FIG. 2, the retro-reflector 22 can be placed in the straight line with respect to the incidence direction of the communication light.

Also, the receiving processor 24 can control the retro-reflector 22 to enable the second modulated signal to be included in the reflected light based on the power generated by the photoelectric cell 21. The receiving processor 24 can also control the second modulated signal to be reflected on the reflected light through the on-off keying method and the method of generating the modulated signal is described below.

Further, the mirror 13 of the above-described transmission module 10 can reflect the reflected light. More specifically, as shown in FIG. 2, the mirror 13 can reflect the reflected light output by the retro-reflector 22 toward the communication light source 12.

The beam splitter 14 of the transmission module 10 can then reflect back the reflected light, which has been reflected by the mirror 13. As shown, the beam splitter 14 can be provided between the mirror 13 and the communication light source 12 to pass a portion of the incident light and reflect other portions of the incident light. Accordingly, the communication light incident on the mirror 13 can be output by the communication light source 12 and passes through the beam splitter 14.

As shown in FIG. 2, the light is reflected by the mirror 13 and is incident toward the communication light source 12 and the beam splitter 14 can reflect again the above-mentioned light toward the first light diode 15. The first photodiode 15 can convert the reflected light, which has been reflected back by the beam splitter 14 into an electrical signal based on the intensity of the light. Further, the electrical signal converted as described above can be provided to the transmitting processor 16. As described above, a decoder can be used to convert the electrical signal converted by the first photodiode 15 into the digital signal.

In addition, the transmitting processor 16 can identify the second modulated signal included in the reflected light based on the electrical signal provided through the first photodiode 15, and perform various kinds of operations to process the signal based on the identified second modulated signal.

Hereinafter, a method of communicating, by the transmission module and the reception module 20 and a method of transmitting the power are described below in detail with reference to FIGS. 2 and 3. As described above, the transmission module 10 and the reception module 20 can perform the communication and the power transmission using the light that goes straight. Accordingly, each module may be required to be arrayed at a preset position with respect to another module to be operated.

Figure 3:
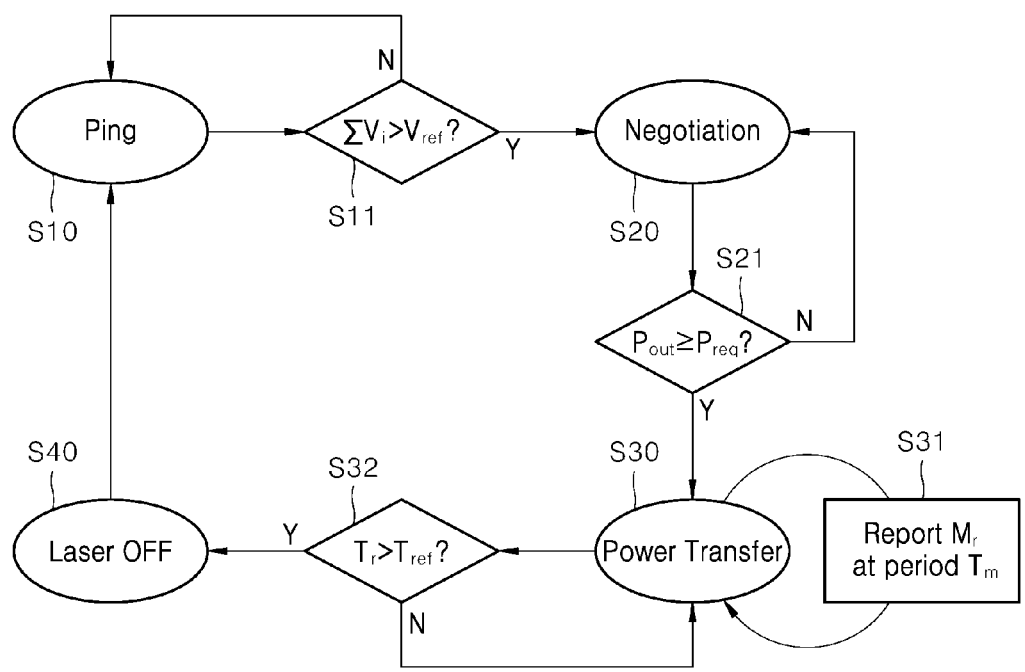
FIG. 3 is a flowchart illustrating operating an optical wireless power transfer system of the present disclosure.

Referring to FIG. 3, in order to determine the above-described array state of modules, the transmission module 10 determines whether the reception module 20 is arrayed at a preset position in a ping mode (S10). More specifically, the transmission module 10 can output the communication light having a reference intensity and determine whether the intensity of the received reflected light is greater than or equal to the reference intensity.

Further, the transmission module 10 can output communication light having the reference intensity, in a form of a continuous wave in the ping mode (S10). In this instance, when the transmission module 10 and the reception module 20 are not arrayed, the communication light is not reflected by the reception module 20 and thus the reflected light is not received at the transmission module 10. On the contrary, when the transmission module 10 and the reception module 20 are arrayed, the communication light can be reflected by the reception module 20 and thus the reflected light can be received at the transmission module 10.

In addition, the transmission module 10 can determine that, when the intensity of the received reflected light is equal to or greater than a reference intensity, the reception module 20 is arrayed at the preset position, and can determine that, when the intensity of the received reflected light is less than the reference intensity, the reception module 20 is not arrayed at the preset position.

For example, the transmission module 10 can determine whether the reception module 20 is arrayed based on comparison of the magnitude of voltage generated based on the reflected light with the reference voltage (S11). More specifically, when the optical wireless power transfer system 1 is provided as shown in FIG. 2, the reflected light output by a retro-reflector 22 can be received at the first photodiode 15. The reflected light received at the first photodiode 15 can then be converted into a voltage Vi having a predetermined magnitude based on the intensity thereof, and the transmitting processor 16 can compare a total of voltages $\Sigma Vi$ converted by the first photodiode 15 with a reference voltage $V_{ref}$.

The transmitting processor 16 can determine that, when the total of the voltages $\Sigma Vi$ converted by the first diode 15 is equal to or greater than the reference voltage $V_{ref}$, the reception module 20 is arrayed at the preset position. On the contrary, the transmitting processor 16 determines that, when the total of voltages $\Sigma Vi$ converted by the first light diode 15 is less than the reference voltage Vref, the reception module 20 is not arrayed at the preset position.

When the transmitting processor 16 determines the reception module 20 is arrayed at the preset position, the transmission module 10 can output the above-mentioned power light and enable the first modulated signal to be included in the communication light. In other words, in the ping mode S10, the transmission module 10 outputs only communication light having a reference intensity in a form of continuous wave without outputting the power light, and outputs the power light and communication light including the first modulated signal, when the transmitting processor 16 determines that the reception module 20 is arrayed at the preset position.

In addition, the transmission module 10 and the reception module 20 may include first and second magnetic bodies 18a, 18b, and 25a, and 25b, respectively, to maintain the above-mentioned array state. In more detail, a plurality of first magnetic bodies 18a and 18b and a plurality of second magnetic bodies 25a and 25b may be provided, and an attraction can be generated between the first magnetic bodies 18a and 18b and the second magnetic bodies 25a and 25b.

For example, as shown in FIG. 2, the transmission module 10 may include a plurality of first magnetic bodies 18a and 18b, and the reception module 20 may also include a plurality of second magnetic bodies 25a and 25b. In this instance, surfaces facing each other, of the first magnetic bodies 18a and 18b and the second magnetic bodies 25a and 25b, may have different polarities, and accordingly, an attraction occurs between the first magnetic bodies 18a and 18b and the second magnetic bodies 25a.

In addition, the attraction enables the transmission module 10 and the reception module 20 to be fixed within a predetermined distance. For example, when a light transmitting material such as plastic or glass is provided between the transmission module 10 and the reception module 20, positions of the transmission module 10 and the reception module 20 can be fixed at both ends of the light transmitting material, respectively, based on the attraction generated between the first magnetic bodies 18 and 18b and the second magnetic bodies 25a and 25b.

Accordingly, after the transmission module 10 and the reception module 20 are arrayed once, the array state can be maintained by the above-described magnetic bodies 18a, 18b, 25a, and 25b unless an external force having a predetermined magnitude or more is applied.

Referring back to FIG. 3, when each module is arrayed, the optical wireless power transfer system 1 can operate in a negotiation mode (S20). In the negotiation mode S20, the transmission module 10 can gradually increase, until a completion message is received from the reception module 20, the magnitude of the output power light. In addition, in the negotiation mode S20, the reception module 20 can generate a second modulated signal including the completion message when the power generated by the power light is greater than or equal to the required power $P_{req}$.

Referring to FIG. 2, the photoelectric cell 21 can receive the power light a magnitude of which is gradually increased and output and can generate the power Pout. The receiving processor 24 can compare the magnitude of the generated power $P_{out}$ with the magnitude of the required power $P_{req}$ (S21). As a result of the comparison, when the magnitude of the generated power Pout is equal to or greater than the magnitude of the required power $P_{req}$, the receiving processor 24 can generate the second modulated signal including the completion message. Subsequently, the receiving processor 24 can control the retro-reflector 22 to enable the second modulated signal including the completion message, to be included in the reflected light.

Further, the transmitting processor 16 can process the second modulated signal included in the reflected light to identify the completion message, and when the completion message is identified, the transmitting processor 16 can maintain a predetermined magnitude of the power light. On the contrary, when the magnitude of the generated power $P_{out}$ is less than the magnitude of the required power $P_{req}$, the receiving processor 24 can generate the second modulated signal including the request message. Subsequently, the receiving processor 24 can control the retro-reflector 22 to enable the second modulated signal to be included in the reflected light, and the second modulated signal includes the request message. The output operation of the request message can be performed during a preset period of time.

In addition, the transmitting processor 16 can gradually increase the magnitude of the power light every time the request message is received. More specifically, the transmitting processor 16 can process the second modulated signal included in the reflected light to identify the request message and gradually increase the magnitude of the power light every time the request message is identified.

Referring back to FIG. 3, when the power generated by the reception module 20 is greater than or equal to the required power and the negotiation mode S20 is completed, the optical wireless power transfer system 1 can perform in a power transfer mode (S30). In the power transfer mode (S30), operation of transferring power can be performed through the power light output by the transmission module 10 and operation of transmitting and receiving a signal can be performed through the communication light and the reflected light output by the transmission module 10 and the reception module 20.

As the operation of transmitting the power and the operation of transmitting and receiving the signal have been described with reference to FIG. 2, a detailed description thereof is omitted. In addition, in the power transmission mode S30, when the power is generated based on the power light, the reception module 20 can generate a second modulated signal including a message of the received power $M_r$ during a reference period of time.

Further, when the message of the received power $M_r$ is not received for a preset period of time, the transmission module 10 can block the output of power light (Laser Off) (S40). Referring to FIG. 2, when the power is generated by the power light received at the photoelectric cell 21 in the power transfer mode S30, the receiving processor 24 can generate the second modulated signal including the message of the receive power $M_r$ during the reference period of time $T_m$.

Subsequently, the receiving processor 24 can control the retro-reflector 22 to enable the second modulated signal to be included in the reflected light and the second modulated signal includes the message of the receiver power $M_r$. As the message of the received power $M_r$ is generated during the reference period of time $T_m$, the second modulated signal including the message of the received power $M_r$ can also be output through the reflected light during the reference period of time $T_m$ (S31).

In addition, the transmitting processor 16 can identify the message of the received power $M_r$ by processing the second modulated signal included in the reflected light, and continuously output the power light and the communication light when the message of the received power $M_r$ is identified. When the transmission module 10 and the reception module 20 are arrayed, the transmission module 10 can receive the message of the received power $M_r$ during a predetermined period of time Tr for which the message of the received power is received.

As the second modulated signal including the message of the received power $M_r$ is output during the reference period of time $T_m$, the message of the received power $M_r$ can be received at the transmitting module 10 during the same period of time $T_r$ for which the message of the received power is received.

Further, when a change occurs in the position of the transmission module 10 or the reception module 20 and the above-described array state may not be maintained, the power light may not be received at the photoelectric cell 21 of the reception module 20, and accordingly, the receiving processor 24 may not generate the second modulated signal including the message of the received power $M_r$. Further, when the array state is not maintained, even if the second modulated signal is generated, the reflected light including the second modulated signal may not be received at the transmission module 10.

In addition, the transmission module 10 can compare the period of time $T_r$ for which the message of the received power $M_r$ is received with a preset time $T_{ref}$ (S32), and as a result of comparison, the transmission module 10 can block, when the period of time $T_r$ for which the message of the received power $M_r$ is received exceeds a preset time $T_{ref}$, the output of the power light.

Further, the preset time $T_{ref}$ may be set longer than the aforementioned reference period of time $T_m$. When the message of the received power $M_r$ is not received within a preset period of time, the transmission module 10 can operate in the ping mode S10 described above to output communication light having the reference intensity. As the operation process after the ping mode S10 has been described above, a detailed description thereof is omitted.

As described above, when the transmission module 10 and the reception module 20 do not maintain the array state, operation of determining the array state thereof is automatically performed through operation of blocking the output (S40) and in the ping mode (S10), thereby saving the energy and improving reliability in communication.

The modulated signals output by the transmission module 10 and the reception module 20 are described below with reference to FIG. 4. The transmission module 10 can adjust the intensity of the communication light and output the communication light, and the reception module 20 can identify the first modulated signal based on the intensity of the communication light. More specifically, the transmitting processor 16 can control the first modulated signal to be included in the communication light through the on-off keying method, the intensity modulation (IM) method, and the like.

However, as described above, the reception module 20 outputs the reflected light including the second modulated signal by reflecting the communication light. In addition, the communication light may have a continuous output. Accordingly, the first modulated signal is preferably included in the communication light through the IM method.

Figure 4:
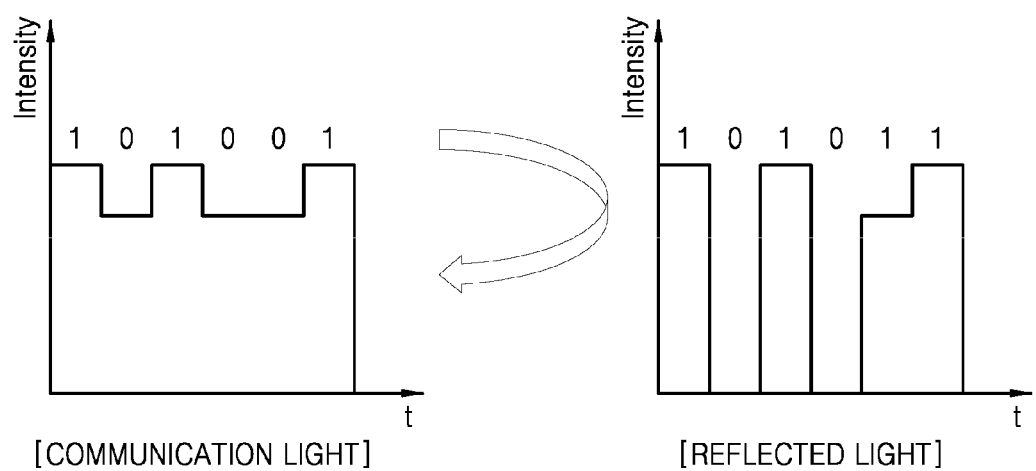
FIG. 4 are graphs illustrating a modulated signal transmitted and received between a transmission module and a reception module.

Referring to FIG. 4, the transmitting processor 16 can adjust the intensity of communication light through the IM method to transmit a first modulated signal including bits of '101001'. More specifically, the communication light may have different intensities corresponding to bits 1 and 0, respectively, and the transmitting processor 16 adjusts the intensity of the communication light to include the first modulated signal, which is a combination of bits 1 and 0, in the communication light.

As described above, the second photodiode 23 of the reception module 20 can generate an electrical signal based on the intensity of the communication light, and the receiving processor 24 can identify the first modulated signal included in the communication light as '101001' based on the magnitude of the electrical signal. In addition, the reception module 20 can reflect the communication light through the on-off keying method and output the reflected light including the second modulated signal.

Referring back to FIG. 4, the receiving processor 24 can control a reflection operation of the retro-reflector 22 through the on-off keying method to transmit a second modulated signal including bits of '101011'. More specifically, the receiving processor 24 can control the retro-reflector 22 to perform the reflection operation during the period of time corresponding to bit 1, and control the retro-reflector 22 not to perform the reflection operation during the period of time corresponding to bit 0.

Accordingly, as shown in FIG. 4, the reflected light can be output only during the period of time corresponding to bit 1. As the reflected light is output by reflecting the communication light, the intensity of the reflected light output can be proportional to the intensity of the communication light. As described above, the first photodiode 15 of the transmission module 10 can generate the electrical signal based on the intensity of the reflected light, and the transmitting processor 16 can identify a second modulation included in the reflected light, as '101011', based on the magnitude of the electrical signal.

An optical wireless power transfer system 1' according to another embodiment of the present disclosure is described below in detail with reference to FIGS. 5 and 6. According to another embodiment of the present disclosure, as shown in FIG. 5, the optical wireless power transfer system 1' may include a transmission module 10' and a reception module 20' arrayed with respect to the transmission module 10'.

The transmission module 10' can output the main light including the first modulated signal and receive the reflected light generated by reflecting a portion of the main light, and process the second modulated signal included in the reflected light. Further, the transmission module 10' may include a processor that processes a signal and a single light source that outputs the main light.

In addition, the reception module 20' can process the first modulated signal included in the main light and reflect a portion of the main light to output the reflected light, and may enable the second modulated signal to be included in the reflected light based on the power generated due to the main light. Further, the reception module 20' may include a processor that processes a signal, a reflector that reflects a portion of the main light, and an optical generator that generates power using the main light.

Figure 5:
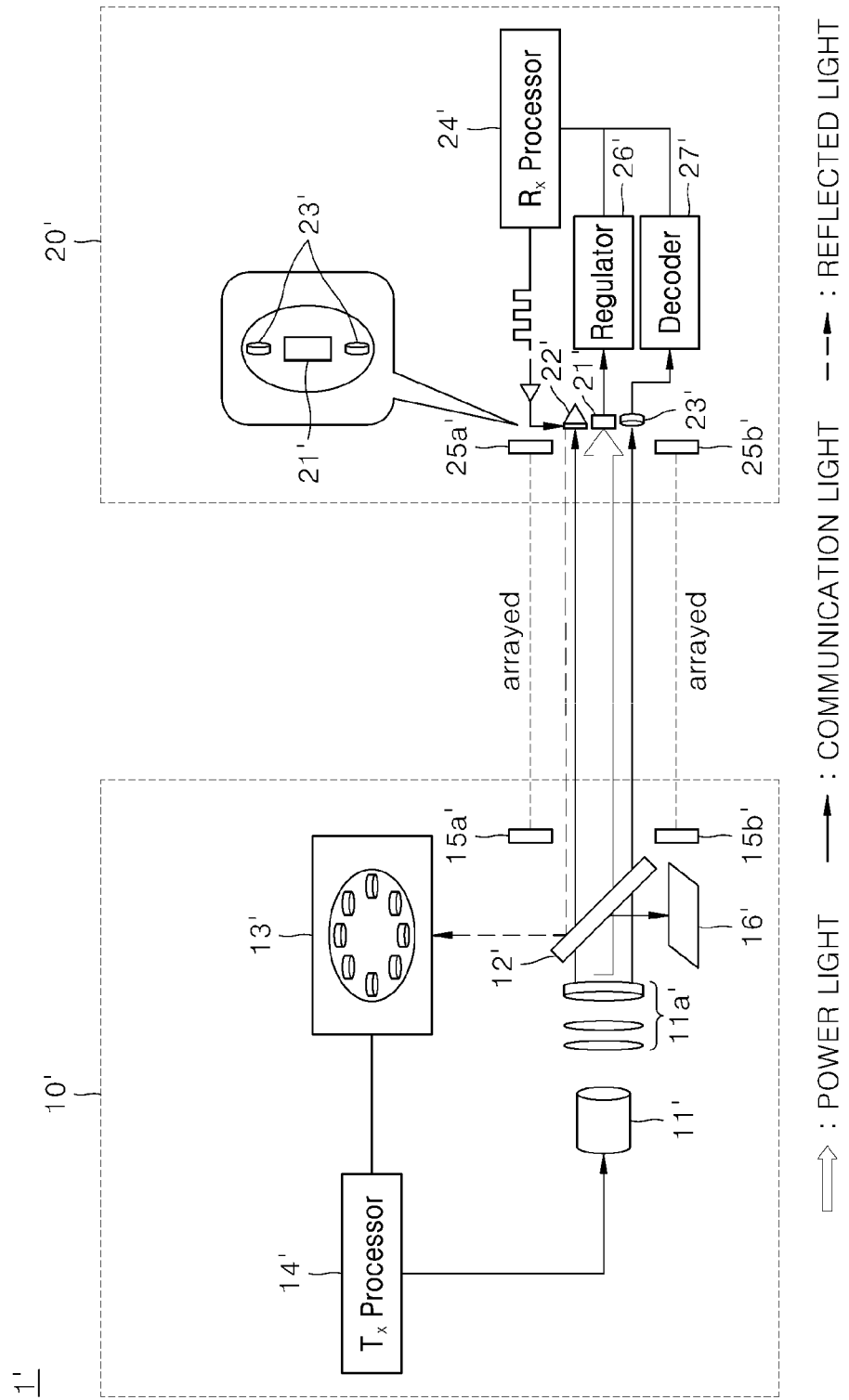
FIG. 5 is an overview illustrating each component of an optical wireless power transfer system according to another embodiment of the present disclosure.
Figure 6:
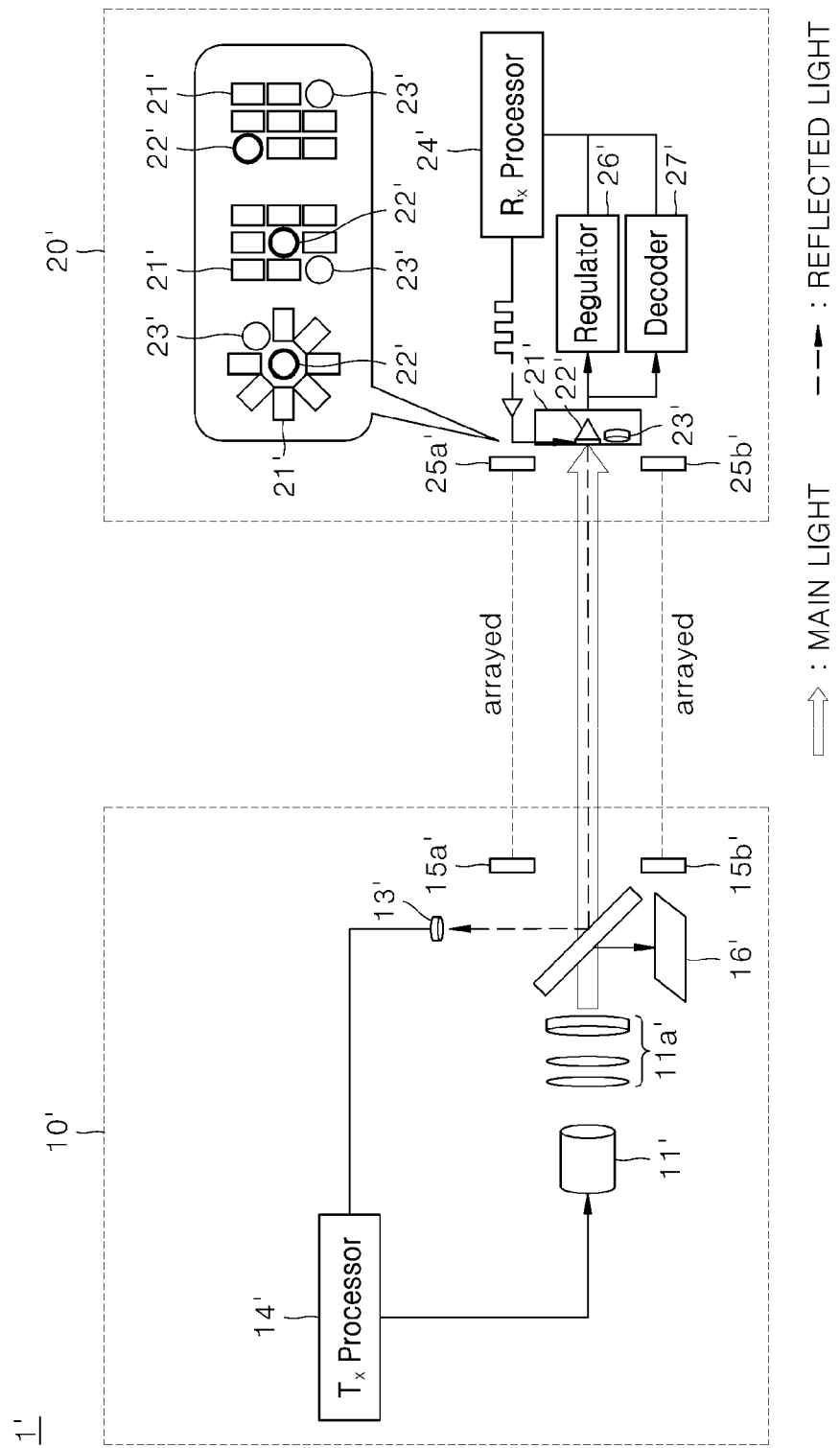
FIG. 6 is an overview illustrating another example of a reception module shown in FIG. 5.

Referring to FIGS. 5 and 6, according to another embodiment of the present disclosure, a transmission module 10' may include a main light source 11', a beam splitter 12', a first photodiode 13', a transmitting processor 14', an optical absorber 16', and first magnetic bodies 15a' and 15b'. In addition, according to another embodiment of the present disclosure, the reception module 20' may include a photoelectric cell 21', a retro-reflector 22', a second photodiode 23', a receiving processor 24', the second magnetic bodies 25a' and 25b', a regulator 26', and a decoder 27'.

The transmission module 10' and the reception module 20' shown in FIGS. 5 and 6 are exemplary, and components of the transmission module 10' and the reception module 20' are not limited to the embodiment shown, and some components of the transmission module 10' and the reception module 20' may be added, changed or deleted as necessary.

Basically, some of the components shown in FIGS. 5 and 6 may be the same as described with reference to FIG. 2.

More specifically, the beam splitter 12', the first photodiode 13', the transmitting processor 14', the first magnetic bodies 15a' and 15b', and the optical absorber 16' included in the transmission module 10' shown in FIGS. 5 and 6 may have the same functions as the beam splitter 14, the first photodiode 15, the transmitting processor 16, the first magnetic bodies 18a and 18b, and the optical absorber shown in FIG. 2, respectively.

However, as shown in FIGS. 5 and 6, the transmission module 10' has a less number of light sources than the transmission module 10 shown in FIG. 2. All other configurations, except for the omitted configurations, may be the same as configurations as shown in FIG. 2 due to the reduced number of light sources.

In addition, each component included in the reception module 20 shown in FIGS. 5 and 6 may be the same as described with reference to FIG. 2. In other words, the photoelectric cell 21', the retro-reflector 22', the second photodiode 23', the receiving processor 24', the second magnetic bodies 25a' and 25b', the regulator 26' and the decoder 27' included in the reception module 20' shown in FIGS. 5 and 6 may have the same functions as the photoelectric cell 21, the retro-reflector 22, the second photodiode 23, the receiving processor 24, the second magnetic bodies 25a and 25b, the regulator 26 and the decoder 27 shown in FIG. 2, respectively.

Accordingly, light and paths of light different from those described in FIG. 2 are described below with reference to FIGS. 5 and 6. In more detail, a main light source 11' of the transmission module 10' outputs the main light.

In the present disclosure, the main light may include both the power light and the communication light described with reference to FIG. 2 with respect to the function thereof. More specifically, the main light can enable the power to be provided to the reception module 20' and also provide the reception module 20' with a specific signal. For example, as shown in FIG. 5, the main light may include the power light output from a center portion thereof and communication light output from a peripheral portion thereof.

The beam splitter 12' of the transmission module 10' can pass the main light. More specifically, the beam splitter 12' may be provided between the main light source 11' and the reception module 20' to pass a portion of incident light and reflect other portions of the incident light. Accordingly, the main light incident on the reception module 20' output by the main light source 11' passes through the beam splitter 12.

Further, the transmitting processor 14' of the transmission module 10' can control the main light source 11' to enable the first modulated signal to be included in the main light. More specifically, the transmitting processor 14' can adjust the intensity of the main light and output the main light having the adjusted intensity to control the first modulated signal to be included in the main light.

As a method of including the first modulated signal in the main light by adjusting the intensity of the light is the same as the method of including the first modulated signal in the communication light described with reference to FIG. 4, a detailed description thereof is omitted. In addition, the photoelectric cell 21' of the reception module 20' can receive the main light to generate the power. Further, the main light source 11' of the transmission module 10' and the photoelectric cell 21' of the reception module 20' may be placed in a straight line.

Also, the regulator 26' can convert the power generated by the photoelectric cell 21' into a predetermined voltage and provide the receiving processor 24' with the predetermined voltage, and accordingly, the receiving processor 24' can receive the power based on the power generated by the photoelectric cell 21'.

In addition, the second photodiode 23' of the reception module 20' can convert a portion of the main light into an electrical signal. More specifically, the second photodiode 23' can receive a portion of the main light according to position thereof and convert the portion of the main light into the electrical signal. Then, the decoder 27' can convert the converted electrical signal into a digital signal and provide the receiving processor 24' with the converted digital signal.

Further, the receiving processor 24' can identify the first modulated signal based on the electrical signal converted by the second photodiode 23' and process the identified first modulated signal. More specifically, the receiving processor 24' can identify the first modulated signal based on the intensity of the main light.

As the method of identifying the first modulated signal based on intensity of the light has been described with reference to FIG. 4, a detailed description thereof is omitted. In addition, the retro-reflector 22' of the reception module 20' can retro-reflect a portion of the main light to output the reflected light. More specifically, the retro-reflector 22' can retro-reflect a portion of the main light according to the position thereof, and Further, the retro-reflector 22' can be placed in the straight line with respect to the incident direction of the main light.

Also, the receiving processor 24' can control the retro-reflector 22' to enable the second modulated signal to be included in the reflected light based on the power generated by the photocell 21'. As the method of including the second modulated signal in the reflected light is the same as the method described with reference to FIG. 4, a detailed description thereof is omitted.

The beam splitter 12' of the above-described transmission module 10' can reflect the reflected light. More specifically, as shown in FIGS. 5 and 6, the beam splitter 12' can reflect a portion of the reflected light output by the retro-reflector 22' toward the first photodiode 13.

The first photodiode 13' can convert the reflected light reflected by the beam splitter 12' into the electrical signal based on the intensity of the light, and the converted electrical signal may be provided to the transmitting processor 14'. The transmitting processor 14' can identify the second modulated signal included in the reflected light based on the electrical signal provided through the first photodiode 13' and can perform operation of processing various kinds of signals based on the identified second modulated signal.

In addition, as shown in FIG. 5, the photoelectric cell 21', the retro-reflector 22', and the second photodiode 23' may be provided at any position such that the photoelectric cell 21', the retro-reflector 22', and the second photodiode 23' can receive the main light. More specifically, the retro-reflector 22' and the second photodiode 23' may be arbitrarily arranged in the region where the main light is received.

For example, referring to FIG. 6, the retro-reflector 22' may be provided at a center of the region where the main light is received, and a plurality of cells included in the photoelectric cell 21' and the second photodiode 23' may have a circular shape or rectangular matrix shape with respect to the retro-reflector 22'. Further, the retro-reflector 22', the second photodiode 23', the plurality of cells included in the photoelectric cell 21' may have any arrangement within the circular shape or the rectangular matrix shape.

As described above, according to the present disclosure, wireless bidirectional communication is performed using the light, thereby increasing the possible distance to perform the communication between terminals. Further, according to the present disclosure, additional battery may not be mounted on the wireless terminal using the light as the power source, thereby reducing the volume and the weight of the terminal. Further, according to the present disclosure, the modulated signal may be transmitted and received through the light, thereby preventing the electromagnetic interference (EMI) generated by peripheral electronic devices.

Various substitutions, modifications, and changes may be made within the scope that does not deviate from the technical idea of the present disclosure for the skilled person in the art to which the present disclosure pertains, the above-mentioned disclosure is not limited to the above-mentioned embodiment and the accompanying drawings.

What is claimed is:

1. An optical wireless power transfer system, comprising:
   a transmission module including:
      a power light source configured to output power light;
      a communication light source configured to output communication light;
      a mirror disposed in a light path of the power light source and the communication light source and configured to pass the power light and reflect the communication light; and
      a transmitting processor configured to modulate the communication light to have a first modulation; and
   a reception module including:
      a photoelectric cell configured to receive the power light from the transmission module and generate power;
      a retro-reflector configured to retro-reflect the communication light back to the transmission module; and
      a receiving processor configured to control the retro-reflector to reflect the communication light to have a second modulation based on the power generated by the photoelectric cell.

2. The optical wireless power transfer system of claim 1, wherein the transmission module further comprises:
   a beam splitter configured to reflect the communication light reflected by the mirror;
   a first photodiode configured to convert the communication light having the second modulation reflected by the beam splitter into an electrical signal, and
   wherein the transmitting processor is further configured to identify the communication light having the second modulation based on the converted electrical signal.

3. The optical wireless power transfer system of claim 2, wherein the reception module further comprises:
   a second photodiode configured to convert the communication light having the first modulation into an electrical signal, and
   wherein the receiving processor is further configured to identify the communication light having the first modulation based on the converted electrical signal.

4. The optical wireless power transfer system of claim 1, wherein the transmitting processor is further configured to:
   control the communication light source to output the communication light having a first predetermined intensity, and
   output, when an intensity of the communication light reflected by the retro-reflector is greater than or equal to a reference intensity, the power light and control the communication light to have the first modulation.

5. The optical wireless power transfer system of claim 1, wherein the transmitting processor is further configured to control the communication light source to gradually increase a magnitude of the power light until the communication light having the second modulation corresponds to a completion message received from the reception module, and
   wherein the receiving processor is further configured to generate the communication light having the second modulation to correspond to the completion message, when the power generated by the power light is greater than or equal to a required power.

6. The optical wireless power transfer system of claim 5, wherein the receiving processor is further configured to generate the communication light having the second modulation to correspond to a request message, when the power generated by the power light is less than the required power, and
   wherein the transmitting processor is further configured to gradually increase the magnitude of the power light when the request message is received.

7. The optical wireless power transfer system of claim 1, wherein the receiving processor is further configured to generate the communication light having the second modulation to correspond to a message of the received power during a reference period of time, when the power is generated based on the power light, and
   wherein the transmitting processor is further configured to prevent the power light from being output, when the message of the received power is not received during the reference period of time.

8. The optical wireless power transfer system of claim 7, wherein the transmitting processor is further configured to output the communication light having a predetermined intensity, when the message of the received power is not received during the reference period of time.

9. The optical wireless power transfer system of claim 1, wherein the transmitting processor is further configured to adjust an intensity of the communication light, and
   wherein the receiving processor is further configured to identify the communication signal having the first modulation based on the intensity of the communication light.

10. The optical wireless power transfer system of claim 1, wherein the receiving processor is further configured to generate the communication light having the first modulation using an on-off keying method.

11. The optical wireless power transfer system of claim 1, wherein the mirror includes a hole disposed in the light path of the power light source to pass the power light to the reception module without being reflected by the mirror.

* * * * *